United States Patent
Matsueda et al.

(10) Patent No.: US 8,133,839 B2
(45) Date of Patent: Mar. 13, 2012

(54) EXHAUST GAS-PURIFYING CATALYST

(75) Inventors: Satoshi Matsueda, Kakegawa (JP); Mareo Kimura, Kakegawa (JP); Akimasa Hirai, Kakegawa (JP); Keiichi Narita, Kakegawa (JP); Hirohisa Tanaka, Ikeda (JP); Mari Uenishi, Ikeda (JP); Isao Tan, Ikeda (JP); Masashi Taniguchi, Ikeda (JP)

(73) Assignees: Cataler Corporation, Kakegawa-shi, Shizuoka (JP); Daihatsu Motor Co., Ltd., Ikeda-Shi, Osaka (JP)

( * ) Notice: Subject to any disclaimer, the term of this patent is extended or adjusted under 35 U.S.C. 154(b) by 286 days.

(21) Appl. No.: 11/915,317

(22) PCT Filed: Jun. 2, 2006

(86) PCT No.: PCT/JP2006/311106
§ 371 (c)(1), (2), (4) Date: Nov. 21, 2007

(87) PCT Pub. No.: WO2006/134787
PCT Pub. Date: Dec. 21, 2006

(65) Prior Publication Data
US 2009/0036300 A1 Feb. 5, 2009

(30) Foreign Application Priority Data
Jun. 16, 2005 (JP) ................. 2005-176522

(51) Int. Cl.
*B01J 23/00* (2006.01)
(52) U.S. Cl. ..................................... 502/349
(58) Field of Classification Search .................. None
See application file for complete search history.

(56) References Cited

U.S. PATENT DOCUMENTS

| 5,075,276 | A |   | 12/1991 | Ozawa et al. |
|-----------|---|---|---------|--------------|
| 5,260,249 | A | * | 11/1993 | Shiraishi et al. .............. 502/304 |
| 6,150,288 | A | * | 11/2000 | Suzuki et al. .................. 501/105 |
| 6,335,305 | B1 | * | 1/2002 | Suzuki et al. .................. 502/325 |
| 6,387,338 | B1 |   | 5/2002 | Anatoly et al. |
| 6,413,898 | B1 | * | 7/2002 | Faber et al. ..................... 502/64 |
| 7,498,288 | B2 |   | 3/2009 | Matsueda et al. |

FOREIGN PATENT DOCUMENTS

JP 5-168926 7/1993
(Continued)

OTHER PUBLICATIONS

Chen, M., et al., "A new preparation method for nano-sized Ce-Zr-Ba mixed oxide with high surface area", Catalysis Today, vol. 93-95, Sep. 1, 2004, pp. 671-674.
(Continued)

Primary Examiner — Melvin Mayes
Assistant Examiner — Stefanie Cohen
(74) Attorney, Agent, or Firm — Morrison & Foerster LLP

(57) ABSTRACT

An exhaust gas-purifying catalyst (1) contains a rare-earth element, an alkaline-earth element, zirconium and a precious metal, wherein an atomic ratio of the alkaline-earth element with respect to a sum of the rare-earth element and the zirconium is 10 atomic % or more, a part of the rare-earth element and a part of zirconium form a composite oxide with at least a part of the alkaline-earth element, and the composite oxide and a part of the precious metal form a solid solution.

21 Claims, 4 Drawing Sheets

FOREIGN PATENT DOCUMENTS

| | | | |
|---|---|---|---|
| JP | 5-168927 | | 7/1993 |
| JP | 06-99069 | | 4/1994 |
| JP | 06-75675 | | 9/1994 |
| JP | 10-000358 | | 1/1998 |
| JP | 10-182155 | | 7/1998 |
| JP | 10-218620 | | 8/1998 |
| JP | 2000-169148 | | 6/2000 |
| JP | 2001-129399 | | 5/2001 |
| JP | 2002-204955 | | 7/2002 |
| JP | 2004-243305 | | 9/2004 |
| JP | 2003072262 | * | 10/2004 |
| JP | 2005-262201 A | | 9/2005 |

OTHER PUBLICATIONS

Liotta, L.F. et al., "A study of the behaviour of Pt supported on $CeO_2$-$ZrO_2$/$Al_2O_3$-BaO as $NO_x$ storage-reduction catalyst for the treatment of lean burn engine emissions", Catalysis Today, vol. 75, No. 1-4, Jul. 3, 2002, pp. 439-449.

Liotta, L.F. et al., "Influence of the SMSI effect on the catalytic activity of a Pt(1%)/$Ce_{0.6}Zr_{0.4}O_2$ catalyst: Saxs, XRD, XPS and TPR investigations", Applied Catalysis B: Environmental, vol. 48, No. 2, Mar. 18, 2004, pp. 133-149.

Vlaic, G. et al., "Morphology of Rhodium Particles in Ex-chloride Rh/$Ce_{0.5}Zr_{0.5}O_2$ Catalyst", Journal of Catalysis, vol. 190, No. 1, Feb. 15, 2000, pp. 182-190.

Extended European Search Report for EP Patent Application No. 06756927.7, mailed Jan. 12, 2009 (12 pages).

Notification of the First Office Action mailed Dec. 4, 2009, for CN Application No. 200680021354.8, with English Translation, eight pages.

Notification of Reasons for Rejection mailed Aug. 23, 2011, for JP Application No. 2005-176552, with English Translation, nine pages.

* cited by examiner

Lean     Rich

EXHAUST GAS-PURIFYING CATALYST

CROSS-REFERENCE TO RELATED APPLICATIONS

This is a national stage under 35 USC §371 of International Application PCT/JP2006/311106 (not published in English), filed on Jun. 2, 2006, which claims priority benefit of Japanese Patent Application No. 2005-176522 filed Jun. 16, 2005. The entire contents of those applications are hereby incorporated by reference herein.

TECHNICAL FIELD

The present invention relates to an exhaust gas-purifying catalyst.

BACKGROUND ART

As an exhaust gas-purifying catalyst that treats exhaust gas of an automobile, a three-way catalyst with precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. Further, the inorganic oxide plays the roles in increasing the specific surface area of the precious metal and suppressing the sintering of the precious metal by dissipating heat generated by the reactions. In particular, ceria has an oxygen storage capacity and is capable of optimizing the oxidation and reduction reactions.

In recent years, occasions when the automotive vehicle such as automobile is driven at high-speed increase as the performance of an engine improves. Additionally, in order to prevent pollution of the air, the regulations on the exhaust gas are made more stringent. Against these backdrops, temperature of the exhaust gas emitted by the automotive vehicle is on the trend of rising.

Further, the automotive vehicle is required to decrease the carbon dioxide emission in order to suppress the global warming. For these reasons, occasions when the supply of fuel to the engine is cut off in the state that the exhaust gas-purifying catalyst is heated to high temperatures are increasing.

That is, the exhaust gas-purifying catalyst is used at temperatures higher than in the past, and occasions when exposed to an atmosphere excessive in oxygen at high temperatures are increasing. For that, in order to provide the exhaust gas-purifying catalyst that delivers a sufficient performance even when used under such a condition, research and development are actively carried out.

For example, JP-A 5-168926 (KOKAI), JP-A 6-75675 (KOUHYO), and JP-A 2000-169148 (KOKAI) describe improving the heat stability of ceria to suppress the reduction in its oxygen storage capacity and the like. Specifically, JP-A 5-168926 (KOKAI) describes an exhaust gas-purifying catalyst containing an element of platinum group, activated alumina, cerium oxide, barium compound and zirconium compound. JP-A 6-75675 (KOUHYO) describes an exhaust gas-purifying catalyst in which a catalyst-supporting layer contains cerium oxide, zirconium oxide and catalytic metal, and at least parts of cerium oxide and zirconium oxide are present as a composite oxide or a solid solution. JP-A 2000-169148 (KOKAI) describes a cerium-based composite oxide represented as the general formula: $Ce_{1-(a+b)}Zr_aY_bO_{2-b/2}$.

Further, JP-A 10-358 (KOKAI) and JP-A 2001-129399 (KOKAI) describe making platinum present as platinum composite oxide to suppress the sintering of platinum. Specifically, JP-A 10-358 (KOKAI) describes an exhaust gas-purifying catalyst using a high heat-resistant composite oxide that contains platinum and alkaline-earth metal element or one or more of group IIIA elements. JP-A 2001-129399 (KOKAI) describes an exhaust gas-purifying catalyst that includes a platinum composite oxide layer containing platinum and alkaline-earth metal element on an inorganic oxide support, in which a layer of oxide of metal Xr which is at least one element selected from Mg, Ca, Sr, Ba, La and Ce, is interposed therebetween.

However, even if the heat-stability of ceria were improved, the sintering of platinum would occur when the exhaust gas-purifying catalysts are exposed to an atmosphere excessive in oxygen at high temperatures, for example at temperatures from 1,000° C. to 1,200° C., and a sufficient activity would not be achieved. Also, in order to produce platinum composite oxide with a high heat-stability, firing at high temperature is necessary. For this reason, a large majority of exhaust gas-purifying catalysts using platinum composite oxide are small in specific surface area and insufficient in activity.

DISCLOSURE OF INVENTION

An object of the present invention is to provide an exhaust gas-purifying catalyst that is less prone to cause a decrease in its activity even when used at high temperatures in an atmosphere whose oxygen concentration is high.

According to an aspect of the present invention, there is provided an exhaust gas-purifying catalyst comprising a rare-earth element, an alkaline-earth element, zirconium and a precious metal, an atomic ratio of the alkaline-earth element with respect to a sum of the rare-earth element and the zirconium being 10 atomic % or more, a part of the rare-earth element and a part of zirconium forming a composite oxide with at least a part of the alkaline-earth element, and the composite oxide and a part of the precious metal forming a solid solution.

BEST MODE FOR CARRYING OUT THE INVENTION

An embodiment of the present invention will be described below.

Figure 1:
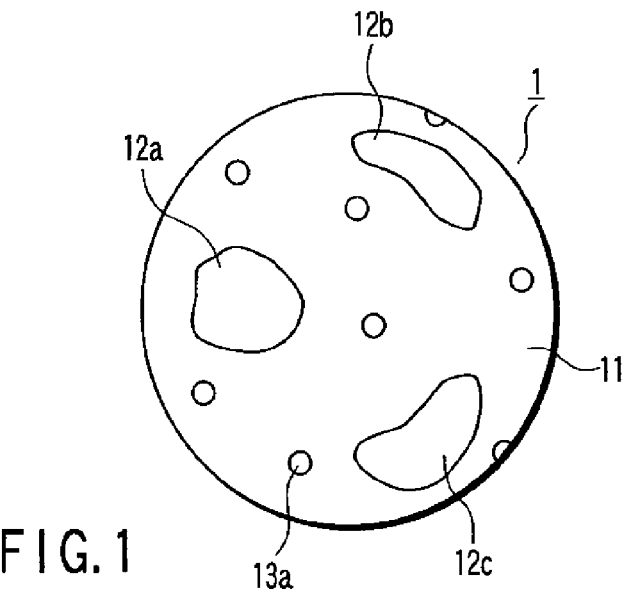
FIG. 1 is a view schematically showing an exhaust gas-purifying catalyst according to an embodiment of the present invention.

FIG. 1 is a view schematically showing an exhaust gas-purifying catalyst according to an embodiment of the present invention. The exhaust gas-purifying catalyst 1 is a pellet catalyst formed by agglomerating particles, and one of the particles is shown in FIG. 1. The exhaust gas-purifying catalyst 1 is used under high temperature conditions of 1,000° C. to 1,200° C., for example.

The exhaust gas-purifying catalyst 1 includes a support 11, composite oxides 12a to 12c partially covering it, and precious metals 13a supported by the support 11.

The support 11 contains an oxide of a rare-earth element as a main component. The support 11 can further contain zirconia ($ZrO_2$), for example. The support 11 may contain a composite oxide of a rare-earth element and zirconium as a main component, for example.

The composite oxide 12a contains a composite oxide of a rare-earth element and an alkaline-earth element as a main component. The composite oxide 12b contains a composite oxide of zirconium and an alkaline-earth element as a main component. The composite oxide 12c contains a composite oxide of a rare-earth element, zirconium and an alkaline-earth element as a main component.

The rare-earth elements contained in the composite oxides 12a to 12c are the same as the rare-earth element contained in the support 11, and the composite oxides 12a to 12c contain the same alkaline-earth element. Also, the composite oxides 12a to 12c contain the same precious metal as the precious metals 13a to form solid solutions.

Here, as an example, it is assumed that the support 11 contains ceria ($CeO_2$) as a main component, the composite oxide 12a is made of a composite oxide represented by a chemical formula: $BaCeO_3$, the composite oxide 12b is made of a composite oxide represented by a chemical formula: $BaZrO_3$, and the composite oxide 12c is made of a composite oxide represented by a chemical formula: $Ba(Zr, Ce)O_3$. Further, it is assumed that the precious metals contained in the composite oxides 12a to 12c and the precious metals 13a are platinum (Pt). That is, it is assumed that cerium is used as the rare-earth element, barium is used as the alkaline-earth element, and platinum is used as the precious metal. Note that the solid solution of the composite oxide 12a and platinum can be represented, for example, by a chemical formula: $Ba(Ce,Pt)O_3$, the solid solution of the composite oxide 12b and platinum can be represented, for example, by a chemical formula: $Ba(Zr,Pt)O_3$, and the solid solution of the composite oxide 12c and platinum can be represented, for example, by a chemical formula: $Ba(Zr, Ce, Pt)O_3$.

The exhaust gas-purifying catalyst 1 exhibits a reversible change in state when a composition of an atmosphere is changed under high temperature conditions. This will be described with reference to FIG. 2.

Figure 2:
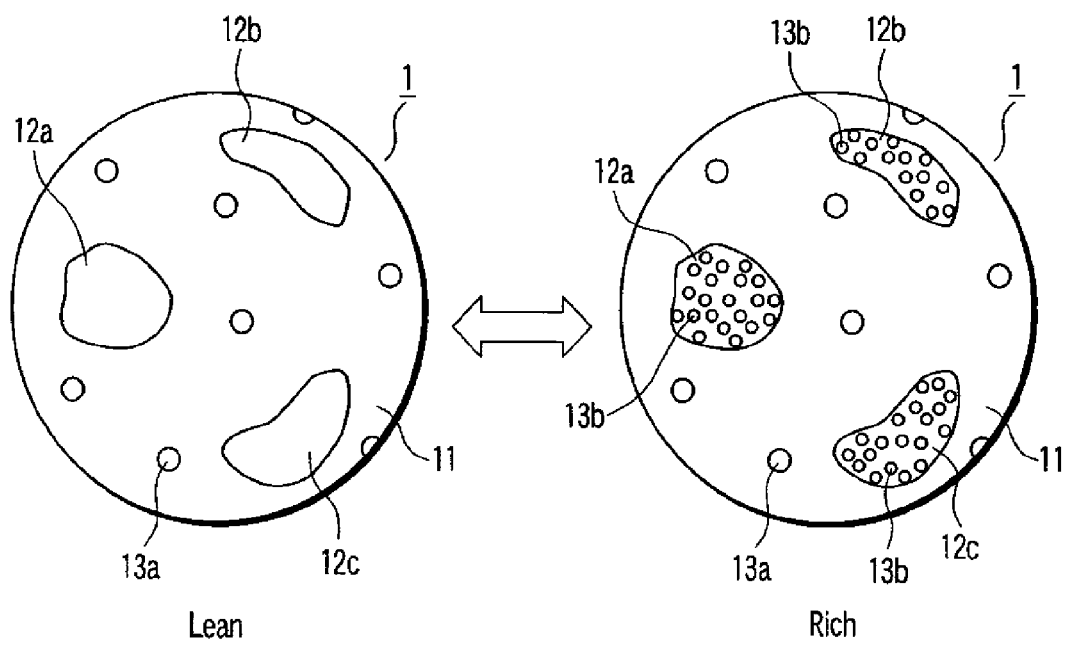
FIG. 2 is a view schematically showing a state change that the exhaust gas-purifying catalyst shown in FIG. 1 exhibits under high temperature conditions.

FIG. 2 is a view schematically showing a state change that the exhaust gas-purifying catalyst shown in FIG. 1 exhibits under high temperature conditions. In FIG. 2, the state indicated as "Lean" shows the state that the exhaust gas-purifying catalyst 1 exhibits when exposed to an atmosphere with a high oxygen concentration under high temperature conditions such as 1,000° C. to 1,200° C., for example, when the fuel supply to an engine is cut off. The state indicated as "Rich" shows the state that the exhaust gas-purifying catalyst exhibits when exposed to an atmosphere with a low oxygen concentration under high temperature conditions such as 1,000° C. to 1,200° C., for example, when an abundance of fuel is continuously supplied to an engine, for example.

The state indicated as "Lean" in FIG. 2 corresponds to the state described with reference to FIG. 1. Here, at least a part of the precious metals 13a may be oxidized; in other words, its oxidation number may be increased.

In this state, the precious metals 13a mainly contribute to the activity of the exhaust gas-purifying catalyst 1, while platinum in the composite oxides 12a to 12c hardly contribute to the activity. However, during the period over which the exhaust gas-purifying catalyst 1 is in the state indicated as "Lean", a concentration of offensive components such as nitrogen oxides, carbon monoxide, hydrocarbons, and the like in the exhaust gas, that is, an offensive component concentration in an atmosphere is relatively low. Thus, the exhaust gas-purifying catalyst 1 delivers a sufficient performance.

When the oxygen concentration in the atmosphere is lowered under the above high temperature conditions, the exhaust gas-purifying catalyst 1 causes a change from the state indicated as "Lean" to the state indicated as "Rich". Specifically, platinum is precipitated out of the composite oxides 12a to 12c, and the precipitated platinum forms the precious metals 13b on the surfaces of the composite oxides 12a to 12c.

During the period over which the exhaust gas-purifying catalyst 1 is in the state indicated as "Rich", the offensive component concentration in the exhaust gas is relatively high. That is, during the period corresponding to the state indicated as "Rich", the exhaust gas-purifying catalyst 1 is required to be higher in activity as compared to the period corresponding to the state indicated as "Lean".

The precious metals 13b are much smaller in size than the precious metals 13a. For example, the sizes of the precious metals 13a are several tens of nanometers, while the sizes of the precious metals 13b are equal to or less than several nanometers. Thus, the exhaust gas-purifying catalyst 1 in the state indicated as "Rich" is higher in activity than the exhaust gas-purifying catalyst 1 in the state indicated as "Lean". Therefore, the exhaust gas-purifying catalyst 1 delivers a sufficient performance even when the offensive component concentration in the exhaust gas is high.

The exhaust gas-purifying catalyst 1 in the state indicated as "Rich" causes a change to the state indicated as "Lean" when the oxygen concentration in the atmosphere increases under the high temperature conditions. That is, platinum forming the precious metals 13b and the composite oxides form the solid solutions. Note that platinum and ceria hardly form a solid solution.

As described above, the exhaust gas-purifying catalyst 1 causes a reversible change in state. In addition, the exhaust gas-purifying catalyst 1 forms the ultrafine precious metals 13b on the surfaces of the composite oxides 12a to 12c every time it causes the change from the state indicated as "Lean" to the state indicated as "Rich". Therefore, this state is recovered by the change from the state indicated as "Rich" to the state indicated as "Lean" and its reverse change. Since an automotive vehicle changes the oxygen concentration in the exhaust gas at relatively close intervals, the exhaust gas-purifying catalyst 1 always exhibits a high activity to deliver a sufficient performance when exposed to a low oxygen concentration atmosphere at high temperatures.

Also, in the exhaust gas-purifying catalyst 1, the precious metals 13a contribute to the activity of the exhaust gas-purifying catalyst 1 regardless of the composition of the atmosphere and temperature. Therefore, the exhaust gas-purifying catalyst 1 delivers a sufficient performance not only when exposed to a high oxygen concentration atmosphere at high temperatures, but also when used for the first time or used under low temperature conditions.

Further, when the oxygen concentration in the atmosphere is increased under high temperature conditions, the exhaust gas-purifying catalyst 1 makes the precious metals 13b and the composite oxides 12a to 12c form the solid solutions as described above. Thus, the exhaust gas-purifying catalyst 1 is low in the evaporation loss of platinum in the high oxygen concentration atmosphere.

Although described is the case where cerium is used as the rare-earth element as an example, other elements may be used as the rare-earth element. For example, lanthanum, praseodymium, neodymium or the like may be used. Alternatively, a plurality of rare-earth elements may be used.

As the alkaline-earth element, elements other than barium may be used. For example, strontium, calcium, magnesium or the like may be used. Alternatively, a plurality of alkaline-earth elements may be used.

As the precious metal, elements other than platinum may be used. For example, elements of the platinum group such as palladium and rhodium may be used. Alternatively, a plurality of precious metals may be used.

In the exhaust gas-purifying catalyst 1, the atomic ratio of the alkaline-earth element with respect to the sum of the rare-earth element and the zirconium is 10 atomic % or more, and typically 20 atomic % or more. The atomic ratio is, for example, 100 atomic % or less, and typically 80 atomic % or less.

In the case where the atomic ratio is small, the volume ratio of the composite oxides 12 with respect to the support 11 is small. Thus, the recovery in performance of the exhaust gas-purifying catalyst 1 caused by the composition fluctuation of the atmosphere may be insufficient. In the case where the atomic ratio is excessively increased, the proportion of the precious metals 13a with respect to whole the precious metal contained in the exhaust gas-purifying catalyst 1 is decreased. Thus, it may be difficult to achieve a sufficient catalytic activity under high temperature and high oxygen concentration conditions. In addition, when the atomic ratio is excessively increased, the heat-resisting property of the support is lowered, and as a result, the sintering of precious metal may be prone to occur.

The content of precious metal in the exhaust gas-purifying catalyst 1 is set, for example, within a range of 0.01% by mass to 10% by mass, and typically within a range of 0.1% by mass to 5% by mass. When the content of precious metal is small, a sufficient catalytic activity may not be achieved. When the content of precious metal is large, the sintering of precious metal may be prone to occur.

The proportion of the precious metal forming the solid solution with respect to the whole precious metal supported by the exhaust gas-purifying catalyst 1, which is referred to as a solid solution-forming ratio hereinafter, is set, for example, within a range of 10% to 80%. When the solid solution-forming ratio is small, the effect of suppressing the decrease in activity due to the sintering of precious metal may be insufficient. When the solid solution-forming ratio is large, the initial activity may be insufficient.

The exhaust gas-purifying catalyst 1 can be manufactured, for example, by the following method.

First, a powdery support 11 containing a composite oxide of a rare-earth element and zirconia as a main component is prepared, and is made into slurry. Here, as the dispersion medium, water is used, for example. Then, a solution of precious metal salt is added to the slurry, and the resultant mixture is filtrated. Thereafter, drying and firing of the filter cake are carried out sequentially. In this way, the precious metal is supported by the support 11.

Next, the support 11 supporting the precious metal is added to a solution of alkaline-earth salt. Then, the slurry is heated so as to sufficiently remove liquid. Thus, the alkaline-earth element is supported by the support 11.

The method of making the support 11 support the alkaline-earth element is not limited. For example, a method that the support 11 supporting the precious metal is impregnated with the solution of the alkaline-earth salt, a method utilizing coprecipitation, a method using an alkoxide of alkaline-earth metal, and the like may be used.

Then, the support 11 supporting the precious metal and the alkaline-earth element is fired in an oxidizing atmosphere. Thus, the composite oxides 12a to 12c and the solid solutions of the composite oxides 12a to 12c and the precious metal are produced so as to obtain the particles shown in FIG. 1.

Further, the powder after firing is subjected to 2a compression-molding, and if necessary, the molded product is crushed. The exhaust gas-purifying catalyst 1 in the form of pellets is obtained by the above method.

In this method, the firing temperature is set, for example, within the range of about 700° C. to about 1,000° C. When the firing temperature is low, producing the composite oxides 12a to 12c and forming the solid solutions of the composite oxides 12a to 12c and precious metal are difficult. When the firing temperature is high, the specific surface area of the support 11 is decreased, and therefore, it becomes difficult to satisfactorily distribute the precious metals 13a over the support 11. As a result, a high activity may not be obtained.

Although the case where the exhaust gas-purifying catalyst 1 is a pellet catalyst is described as an example, the exhaust gas-purifying catalyst 1 may take various forms. For example, the exhaust gas-purifying catalyst 1 may be a monolith catalyst.

Examples of the present invention will be described below.

EXAMPLE 1

Cerium nitrate [$Ce(NO_3)_3$] and zirconium oxynitrate [$ZrO(NO_3)_2$] were weighed such that cerium and zirconium had an atomic ratio of 50:50 and were added to 500 mL of deionized water. After stirring sufficiently, an aqueous solution containing 10% by mass of ammonium hydroxide was dropped into the aqueous solution at room temperature to cause coprecipitation. The aqueous solution containing the copricipitate was stirred for 60 minutes and then filtrated.

The filter cake was sufficiently washed with deionized water and dried at 110° C. The dried material was subjected to a calcination at 500° C. for 3 hours in the atmosphere. The calcined material was crushed by using a mortar and fired at 800° C. for 5 hours in the atmosphere.

The measurement of diffraction spectrum utilizing an X-ray diffractometer was carried out on the powder thus obtained. As a result, it was proved that the powder was made of an oxide represented by a chemical formula: $(Ce,Zr)O_2$. Note that the specific surface area of the powder was 90 $m^2/g$.

50 g of the oxide powder was weighed and added into 500 mL of deionized water. After the oxide powder was well dispersed in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the exhaust gas-purifying catalyst as the final product would be 1% by mass.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was calcined at 500° C. in the atmosphere. Thus, platinum was supported by the oxide.

Subsequently, barium acetate was dissolved into 100 mL of deionized water. Then, 50 g of the oxide supporting platinum was weighed and added into the aqueous solution of barium acetate. Note that the concentration of the aqueous solution of barium acetate was adjusted such that the atomic ratio of barium with respect to the sum of cerium and zirconium in the exhaust gas-purifying catalyst as the final product would be 10.0 atomic %.

Then, the slurry was heated so as to remove the excess water. Next, it was fired at 1,000° C. for 3 hours in the atmosphere. Thus, a composite oxide containing barium and a solid solution of the composite oxide and platinum were produced.

The measurement of diffraction spectrum utilizing an X-ray diffractometer was carried out on the powder thus obtained. The result is shown in FIG. 3.

Figure 3:
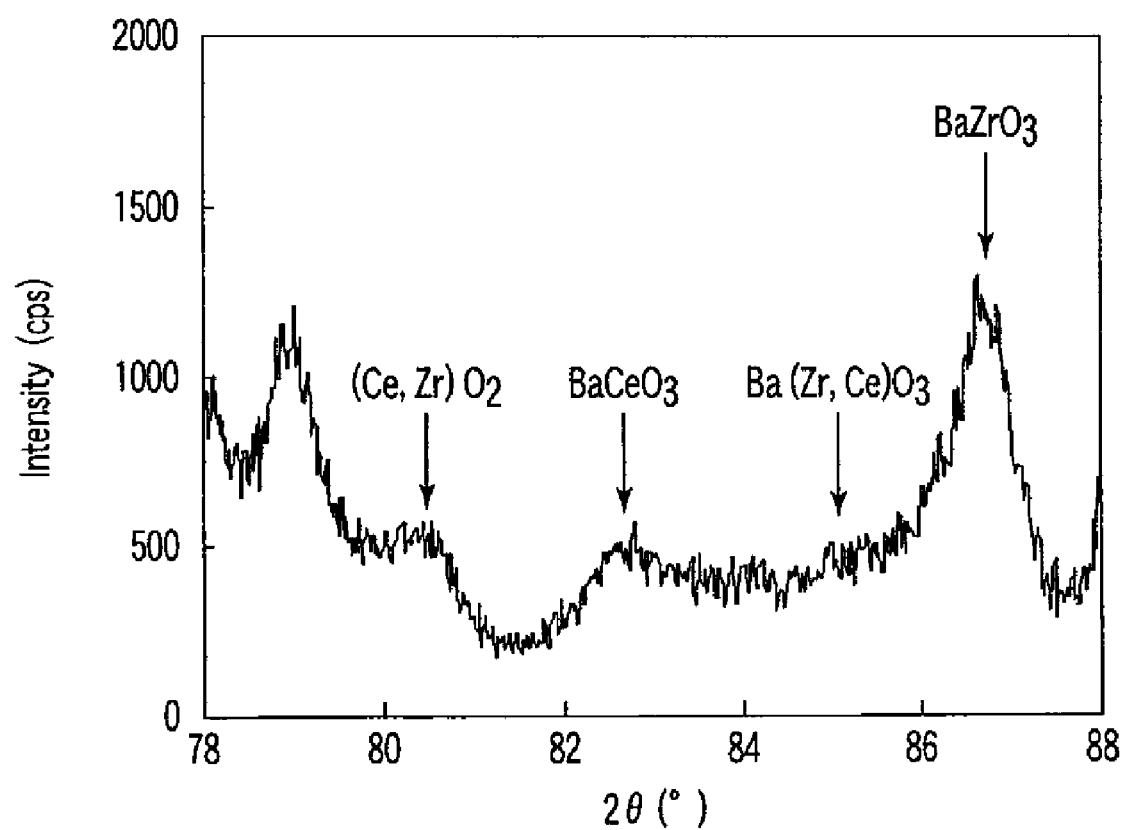
FIG. 3 is a graph showing an X-ray diffraction spectrum of the powder produced in Example 1.

FIG. 3 is a graph showing the X-ray diffraction spectrum of the powder produced in Example 1. In the figure, the abscissa denotes the diffraction angle, while the ordinate denotes the diffraction intensity. As shown in FIG. 3, the powder contained the composite oxide represented by the chemical formula: $BaCeO_3$, the composite oxide represented by the chemical formula: $BaZrO_3$, and the composite oxide represented by the chemical formula: $Ba(Zr, Ce)O_3$ in addition to the composite oxide represented by the chemical formula: $(Ce,Zr)O_2$.

A part of the powder thus obtained was taken and immersed for 12 hours in a 10% aqueous hydrogen fluoride held at room temperature. Note that this condition allowed only the barium-containing composite oxides of the above powder to be dissolved. Subsequently, the solution was filtrated, and the filtrate was subjected to ICP spectrometry. As a result, the platinum content of the filtrate revealed that 45% of platinum formed the solid solution, in other words, the solid solution-forming ratio was 45%.

Next, the powder was compression-molded. Further, the molded product was crushed so as to obtain an exhaust gas-purifying catalyst in the form of pellets with particle diameters of about 0.5 mm to about 1.0 mm.

EXAMPLE 2

An exhaust gas-purifying catalyst was produced by the same method as described in Example 1 except that the concentration and loading of the aqueous solution of barium acetate were adjusted such that the atomic ratio of barium with respect to the sum of cerium and zirconium in the final product would be 30 atomic %.

In this example, the platinum content and the solid solution-forming ratio were determined by the methods as described in Example 1. As a result, the platinum content was 1% by mass and the solid solution-forming ratio was 65%.

EXAMPLE 3

An exhaust gas-purifying catalyst was produced by the same method as described in Example 1 except that the concentration and loading of the aqueous solution of barium acetate were adjusted such that the atomic ratio of barium with respect to the sum of cerium and zirconium in the final product would be 50 atomic %.

In this example, the platinum content and the solid solution-forming ratio were determined by the methods as described in Example 1. As a result, the platinum content was 1% by mass and the solid solution-forming ratio was 70%.

EXAMPLE 4

An exhaust gas-purifying catalyst was produced by the same method as described in Example 1 except that the concentration and loading of the aqueous solution of barium acetate were adjusted such that the atomic ratio of barium with respect to the sum of cerium and zirconium in the final product would be 80 atomic %.

In this example, the platinum content and the solid solution-forming ratio were determined by the methods as described in Example 1. As a result, the platinum content was 1% by mass and the solid solution-forming ratio was 85%.

EXAMPLE 5

An exhaust gas-purifying catalyst was produced by the same method as described in Example 1 except that the concentration and loading of the aqueous solution of barium acetate were adjusted such that the atomic ratio of barium with respect to the sum of cerium and zirconium in the final product would be 100 atomic %.

In this example, the platinum content and the solid solution-forming ratio were determined by the methods as described in Example 1. As a result, the platinum content was 1% by mass and the solid solution-forming ratio was 85%.

COMPARATIVE EXAMPLE

An exhaust gas-purifying catalyst was produced by the same method as described in Example 1 except that the processes from addition of the oxide supporting platinum into the aqueous solution of barium acetate to the firing thereafter were omitted.

In this example, the platinum content was determined by the methods as described in Example 1. As a result, the platinum content was 1% by mass.

EXAMPLE 6

In this example, the oxide powder represented by the chemical formula: $(Ce,Zr,Y)O_2$ was produced first by the following method.

That is, cerium nitrate $[Ce(NO_3)_3]$, zirconium oxynitrate $[ZrO(NO_3)_2]$ and yttrium nitrate $[Y(NO_3)_3]$ were weighed such that cerium, zirconium and yttrium had an atomic ratio of 45:50:5 and were added to 500 mL of deionized water. After stirring sufficiently, an aqueous solution containing 10% by mass of ammonium hydroxide was dropped into the aqueous solution at room temperature to cause coprecipitation. The aqueous solution containing the copricipitate was stirred for 60 minutes and then filtrated.

The filter cake was sufficiently washed with deionized water and dried at 110° C. The dried material was subjected to a calcination at 500° C. for 3 hours in the atmosphere. The calcined material was crushed by using a mortar and fired at 800° C. for 5 hours in the atmosphere.

The measurement of diffraction spectrum utilizing an X-ray diffractometer was carried out on the powder thus obtained. As a result, it was proved that the powder was made of an oxide represented by a chemical formula: $(Ce,Zr,Y)O_2$. Note that the specific surface area of the powder was go m²/g.

An exhaust gas-purifying catalyst was produced by the same method as described in Example 1 except that this oxide powder was used instead of the oxide powder represented by the chemical formula: $(Ce,Zr)O_2$ and the concentration and loading of the aqueous solution of barium acetate were adjusted such that the atomic ratio of barium with respect to the sum of cerium and zirconium in the final product would be 30 atomic %.

In this example, the platinum content and the solid solution-forming ratio were determined by the methods as described in Example 1. As a result, the platinum content was 1% by mass and the solid solution-forming ratio was 80%.

EXAMPLE 7

In this example, the oxide powder represented by the chemical formula: (Ce,Zr,La,Nd)O$_2$ was produced first by the following method.

That is, cerium nitrate [Ce(NO$_3$)$_3$], zirconium oxynitrate [ZrO(NO$_3$)$_2$], lanthanum nitrate [La(NO$_3$)$_3$] and neodymium nitrate [Nd(NO$_3$)$_3$] were weighed such that cerium, zirconium, lanthanum and neodymium had an atomic ratio of 50:35:10:5 and were added to 500 mL of deionized water. After stirring sufficiently, an aqueous solution containing 10% by mass of ammonium hydroxide was dropped into the aqueous solution at room temperature to cause coprecipitation. The aqueous solution containing the copricipitate was stirred for 60 minutes and then filtrated.

The filter cake was sufficiently washed with deionized water and dried at 110° C. The dried material was subjected to a calcination at 500° C. for 3 hours in the atmosphere. The calcined material was crushed by using a mortar and fired at 800° C. for 5 hours in the atmosphere.

The measurement of diffraction spectrum utilizing an X-ray diffractometer was carried out on the powder thus obtained. As a result, it was proved that the powder was made of an oxide represented by a chemical formula: (Ce,Zr,La,Nd)O$_2$. Note that the specific surface area of the powder was 90 m$^2$/g.

An exhaust gas-purifying catalyst was produced by the same method as described in Example 6 except that this oxide powder was used.

In this example, the platinum content and the solid solution-forming ratio were determined by the methods as described in Example 1. As a result, the platinum content was 1% by mass and the solid solution-forming ratio was 70%.

Next, the endurance of these exhaust gas-purifying catalysts was tested by the following method.

First, each exhaust gas-purifying catalyst was set in a flow-type endurance test apparatus, and a gas containing nitrogen as a main component was made to flow through the catalyst bed at a flow rate of 1000 mL/minute for 30 hours. The temperature of the catalyst bed was held at 1050° C. As the gas made to flow through the catalyst bed, a lean gas prepared by adding oxygen to nitrogen at a concentration of 5% and a rich gas prepared by adding carbon monoxide to nitrogen at a concentration of 10% were used, and these gases were switched at intervals of 5 minutes.

Next, each exhaust gas-purifying catalyst was set in an atmospheric fixed bed flow reactor. Then, the temperature of the catalyst bed was raised from 100° C. to 500° C. at the temperature increase rate of 12° C./minute and the exhaust gas-purifying ratio was continuously measured while a model gas was made to flow through the catalyst bed. As the model gas, the gas containing equivalent amounts of oxidizing components (oxygen and nitrogen oxides) and reducing components (carbon monoxide, hydrocarbons and hydrogen), which were adjusted stoichiometrically, was used. The results were shown in the table below.

TABLE 1

| | Composition of catalyst | | | | | | | Solid solution-forming ratio (%) | 50% purifying temperature (° C.) | |
|---|---|---|---|---|---|---|---|---|---|---|
| | Ce (at %) | Zr (at %) | Y (at %) | La (at %) | Nd (at %) | Pt (wt %) | AE/(RE + Zr) (%) | | HC | NO$_x$ |
| Ex. 1 | 50 | 50 | 0 | 0 | 0 | 1 | 10 | 45 | 305 | 320 |
| Ex. 2 | 50 | 50 | 0 | 0 | 0 | 1 | 30 | 65 | 290 | 285 |
| Ex. 3 | 50 | 50 | 0 | 0 | 0 | 1 | 50 | 70 | 295 | 290 |
| Ex. 4 | 50 | 50 | 0 | 0 | 0 | 1 | 80 | 85 | 305 | 300 |
| Ex. 5 | 50 | 50 | 0 | 0 | 0 | 1 | 100 | 85 | 315 | 330 |
| Ex. 6 | 45 | 50 | 5 | 0 | 0 | 1 | 30 | 80 | 285 | 280 |
| Ex. 7 | 50 | 35 | 0 | 10 | 5 | 1 | 30 | 70 | 290 | 283 |
| Comp. Ex. | 50 | 50 | 0 | 0 | 0 | 1 | 0 | 0 | 325 | 340 |

In the above table, the columns denoted by "Ce", "Zr", "Y", "La" and "Nd" show the atomic ratios of cerium, zirconium, yttrium, lanthanum and neodymium with respect to metal elements other than platinum contained in the exhaust gas-purifying catalyst, respectively. The column denoted by "EPt" shows the mass ratio of platinum with respect to the exhaust gas-purifying catalyst. The column denoted by "AE/(RE+Zr)" shows the atomic ratio of alkaline-earth elements, barium in this case with respect to the sum of rare-earth elements and zirconium in the exhaust gas-purifying catalyst. The column denoted by "50% purifying temperature" shows the lowest temperature of the catalyst bed at which 50% or more of each component contained in the model gas was purified. "HC" and "NO$_x$" represent hydrocarbons and nitrogen oxides, respectively.

As shown in the table, the exhaust gas-purifying catalysts according to Example 1 to 7 could purify the model gas at lower temperatures as compared to the exhaust gas-purifying catalyst according to Comparative example. This result revealed that the exhaust gas-purifying catalysts according to Example 1 to 7 were excellent in endurance as compared to the exhaust gas-purifying catalyst according to Comparative example.

Next, the exhaust gas-purifying catalyst according to Example 2 was set in the flow-type endurance test apparatus again, and the lean gas was made to flow therethrough. Then, the gas made to flow through the catalyst bed was switched from the lean gas to the rich gas. Note that the temperature of the catalyst bed was held at 1,050° C. Thereafter, the temperature of the catalyst bed was lowered while the rich gas was kept flowing through the catalyst bed. After the temperature of the catalyst bed was lowered sufficiently, the exhaust gas-purifying catalyst was observed by a transmission electron microscope (TEM). The TEM image is shown in FIG. 4.

Figure 4:
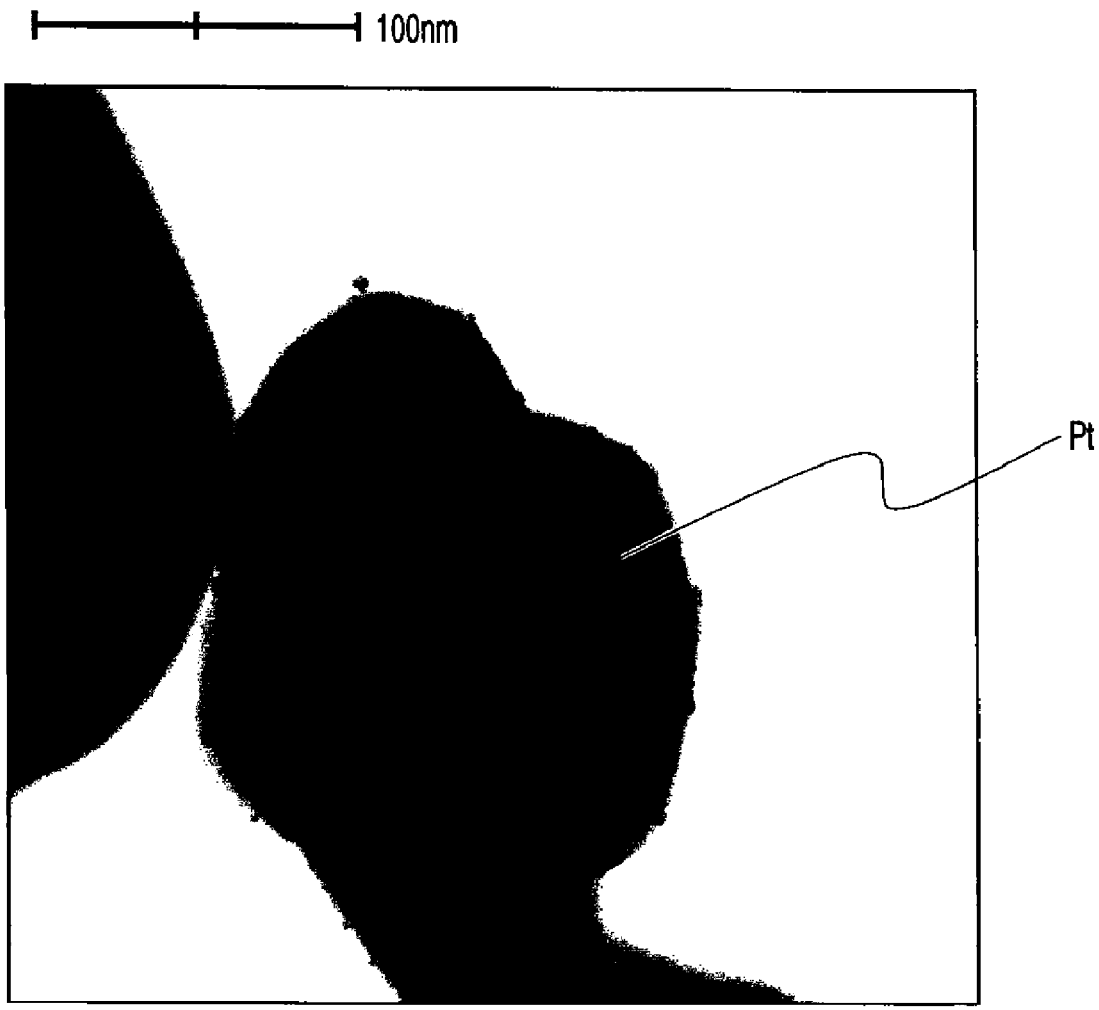
FIG. 4 is a TEM photograph of the exhaust gas-purifying catalyst according to Example 2.

FIG. 4 is a TEM photograph of the exhaust gas-purifying catalyst according to Example 2. As shown in FIG. 4, many platinum (Pt) precipitates were formed on the composite oxides containing barium, and the size of the platinum precipitates was very small. As above, many ultrafine platinum particles were present on the composite oxide of the exhaust gas-purifying catalyst according to Example 2 just after switching the flow gas from the lean gas to the rich gas under high temperature conditions.

After that, the exhaust gas-purifying catalyst according to Example 2 was set in the flow-type endurance test apparatus, and the above lean gas was made to flow through the catalyst bed while the catalyst bed was held at 1,050° C. Then, the temperature of the catalyst bed was lowered while the lean gas was kept flowing through the catalyst bed. After the temperature of the catalyst bed was lowered sufficiently, a part of the exhaust gas-purifying catalyst was drawn therefrom, measurement of diffraction spectrum utilizing an X-ray diffractometer was carried out thereon, and its solid solution-forming ratio was determined by the same method as described in Example 1.

Next, the catalyst bed containing the remainder of the exhaust gas-purifying catalyst was heated to 1,050° C., and the above rich gas was made to flow through the catalyst bed. Then, the temperature of the catalyst bed was lowered while the rich gas was kept flowing through the catalyst bed. After the temperature of the catalyst bed was lowered sufficiently, a part of the exhaust gas-purifying catalyst was drawn therefrom, measurement of diffraction spectrum utilizing an X-ray diffractometer was carried out thereon, and its solid solution-forming ratio was determined by the same method as described in Example 1.

Further, the catalyst bed containing the remainder of the exhaust gas-purifying catalyst was heated to 1,050° C., and the above lean gas was made to flow through the catalyst bed. Then, the temperature of the catalyst bed was lowered while the lean gas was kept flowing through the catalyst bed. After the temperature of the catalyst bed was lowered sufficiently, a part of the exhaust gas-purifying catalyst was drawn therefrom, measurement of diffraction spectrum utilizing an X-ray diffractometer was carried out thereon, and its solid solution-forming ratio was determined by the same method as described in Example 1.

Figure 5:
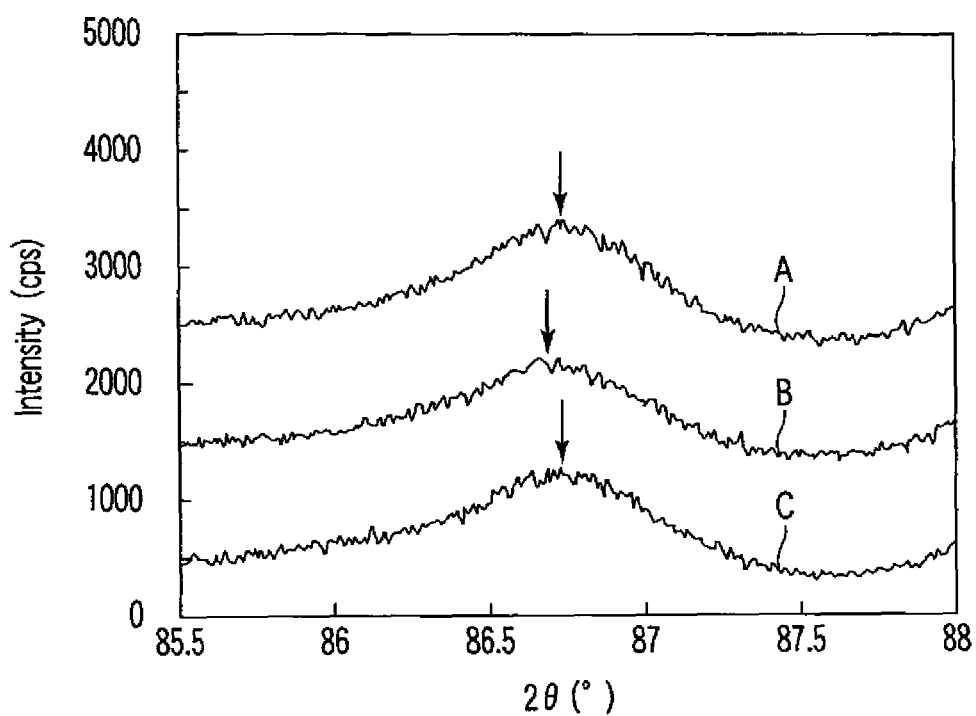
FIG. 5 is a graph showing a change in X-ray diffraction spectrum associated with a change in composition of an atmosphere obtained on the exhaust gas-purifying catalyst according to Example 2.

FIG. 5 is a graph showing a change in X-ray diffraction spectrum associated with a change in composition of an atmosphere obtained on the exhaust gas-purifying catalyst according to Example 2. In the figure, the abscissa denotes the diffraction angler while the ordinate denotes the detection intensity. Also, in the figure, the curve A is the diffraction spectrum obtained just after the lean gas was made to flow for the first time, curve B is the diffraction spectrum just after the rich gas was made to flow, and the curve C is the diffraction spectrum just after the lean gas was made to flow again.

In FIG. 5, the peaks originated from composite oxide represented by the chemical formula: $BaZrO_3$ are depicted as an example. As shown in the figure, the position of the peak originated from the composite oxide represented by the chemical formula: $BaZrO_3$ was shifted toward the side of small angle when the flow gas was switched from the lean gas to the rich gas and was shifted toward the side of large angle when the flow gas was switched from the rich gas to the lean gas. Further, the position of the peak was shifted toward the side of small angle when the flow gas was switched from the lean gas to the rich gas again. This reveals that the composite oxide exhibits a reversible change in state when a composition of an atmosphere is changed.

Figure 6:
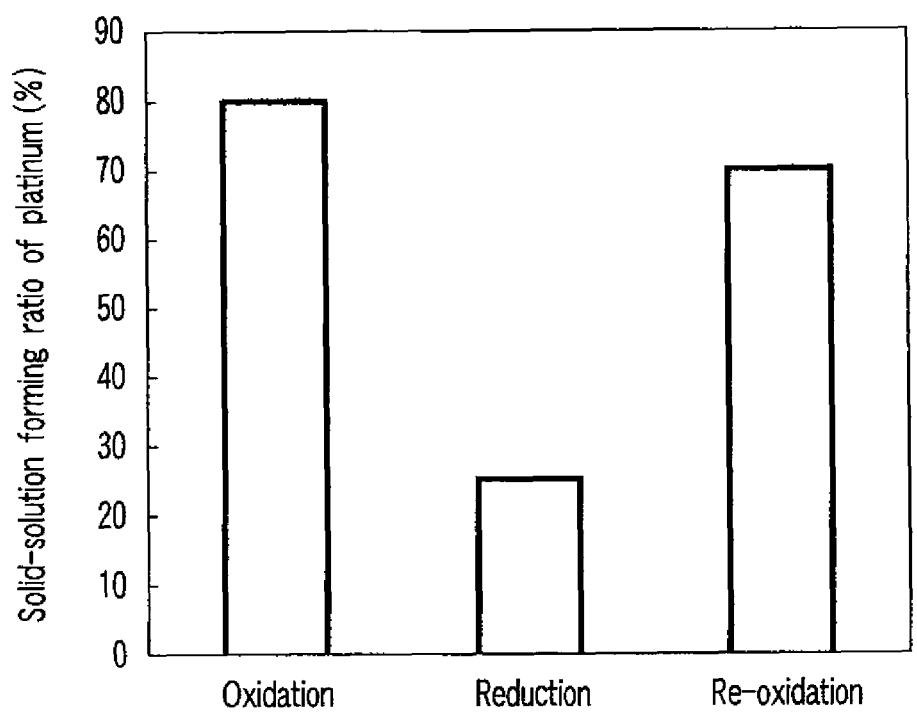
FIG. 6 is a graph showing a change in the solid solution-forming ratio associated with a change in composition of an atmosphere obtained on the exhaust gas-purifying catalyst according to Example 2.

FIG. 6 is a graph showing a change in the rate of forming a solid solution associated with a change in composition of an atmosphere obtained on the exhaust gas-purifying catalyst according to Example 2. In the figure, the data denoted by "Oxidation" shows the solid solution-forming ratio measured just after the lean gas was made to flow for the first time, the data denoted by "Reduction" shows the solid solution-forming ratio measured just after the rich gas was made to flow, and the data denoted by "Re-oxidation" shows the solid solution-forming ratio just after the lean gas was made to flow again.

As apparent from FIG. 6, the exhaust gas-purifying catalyst according to Example 2 produced a solid solution of a composite oxide and platinum by switching the gas made to flow from the rich gas to the lean gas at a high temperature, and platinum was precipitated out of the composite oxide by switching the gas made to flow from the lean gas to the rich gas at a high temperature. The same test was performed on each of the exhaust gas-purifying catalysts according to Examples 1 and 3 to 7, and the same result was obtained. That is, each of the exhaust gas-purifying catalysts according to Examples 1 and 3 to 7 produced a solid solution of a composite oxide and platinum by switching the gas made to flow from the rich gas to the lean gas at a high temperature, and platinum was precipitated out of the composite oxide by switching the gas made to flow from the lean gas to the rich gas at a high temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. An exhaust gas-purifying catalyst comprising a rare-earth element, an alkaline-earth element, zirconium and a precious metal, an atomic ratio of the alkaline-earth element with respect to a sum of the rare-earth element and the zirconium being 10 atomic % or more, a part of the rare-earth element and a part of zirconium forming a composite oxide with at least a part of the alkaline-earth element, and the composite oxide and 10% to 80% of the precious metal forming a solid solution.

2. The exhaust gas-purifying catalyst according to claim 1, wherein the catalyst comprises cerium as the rare-earth element.

3. The exhaust gas-purifying catalyst according to claim 2, further comprising a rare-earth element other than cerium.

4. The exhaust gas-purifying catalyst according to claim 2, further comprising yttrium as the rare-earth element.

5. The exhaust gas-purifying catalyst according to claim 3, wherein the catalyst comprises barium as the alkaline-earth element.

6. The exhaust gas-purifying catalyst according to claim 5, wherein the atomic ratio is 100 atomic % or less.

7. The exhaust gas-purifying catalyst according to claim 6, wherein a content of the precious metal falls with in a range of 0.01% by mass to 10% by mass.

8. The exhaust gas-purifying catalyst according to claim 2, wherein the catalyst comprises barium as the alkaline-earth element.

9. The exhaust gas-purifying catalyst according to claim 8, wherein the atomic ratio is 100 atomic% or less.

10. The exhaust gas-purifying catalyst according to claim 9, wherein a content of the precious metal falls within a range of 0.01% by mass to 10% by mass.

11. The exhaust gas-purifying catalyst according to claim 1, wherein the catalyst comprises barium as the alkaline-earth element.

12. The exhaust gas-purifying catalyst according to claim 1, wherein the atomic ratio is 100 atomic % or less.

13. The exhaust gas-purifying catalyst according to claim 1, wherein a content of the precious metal falls within a range of 0.01% by mass to 10% by mass.

14. The exhaust gas-purifying catalyst according to claim 2, wherein an atomic ratio of cerium with respect to zirconium is 45/50 or more.

15. The exhaust gas-purifying catalyst according to claim 14, further comprising a rare-earth element other than cerium.

16. The exhaust gas-purifying catalyst according to claim 14, wherein the atomic ratio is 100 atomic % or less.

17. The exhaust gas-purifying catalyst according to claim 14, wherein a content of the precious metal falls with in a range of 0.01% by mass to 10% by mass.

18. The exhaust gas-purifying catalyst according to claim 2, wherein an atomic ratio of cerium with respect to zirconium falls within a range of 45/50 to 50/35.

19. The exhaust gas-purifying catalyst according to claim 18, further comprising a rare-earth element other than cerium.

20. The exhaust gas-purifying catalyst according to claim 18, wherein the atomic ratio is 100 atomic % or less.

21. The exhaust gas-purifying catalyst according to claim 18, wherein a content of the precious metal falls with in a range of 0.01% by mass to 10% by mass.

* * * * *